INVENTORS
ARTHUR S. CASWELL
SIGURD O. RODESEIKE
BY
OSTROLENK, FABER, GERB & SOFFEN
ATTORNEYS

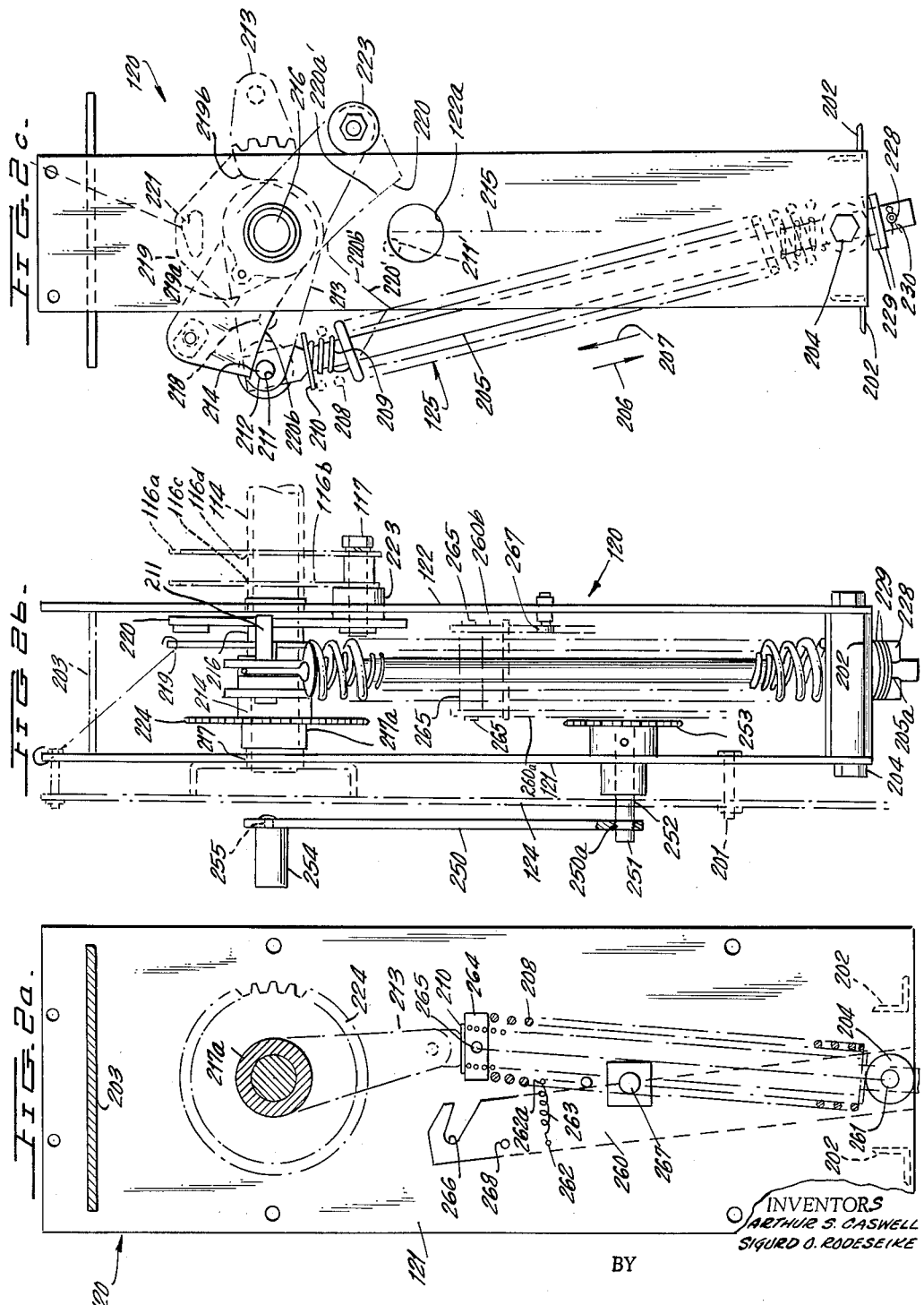

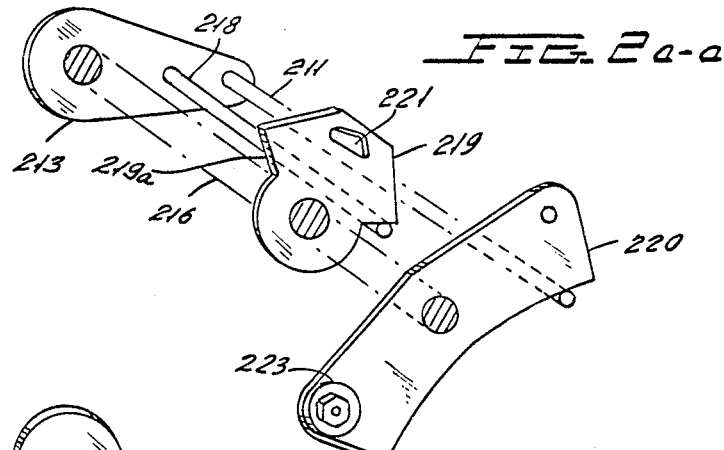
FIG. 2a-a
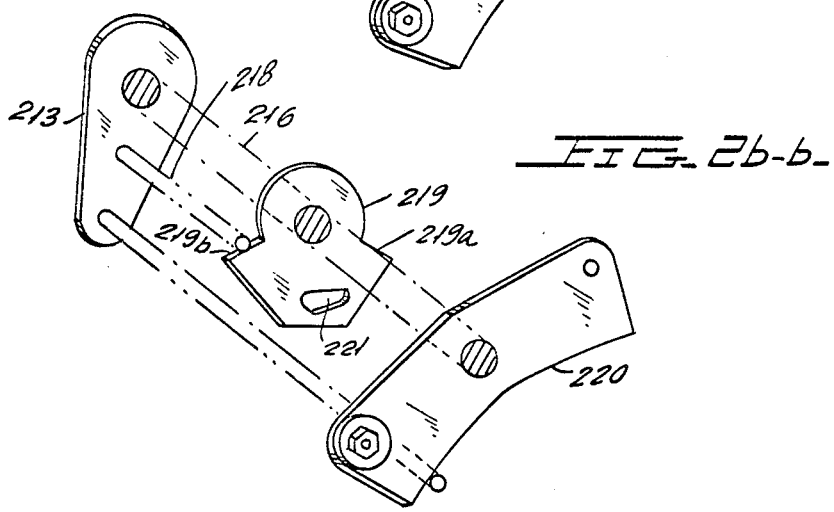
FIG. 2b-b
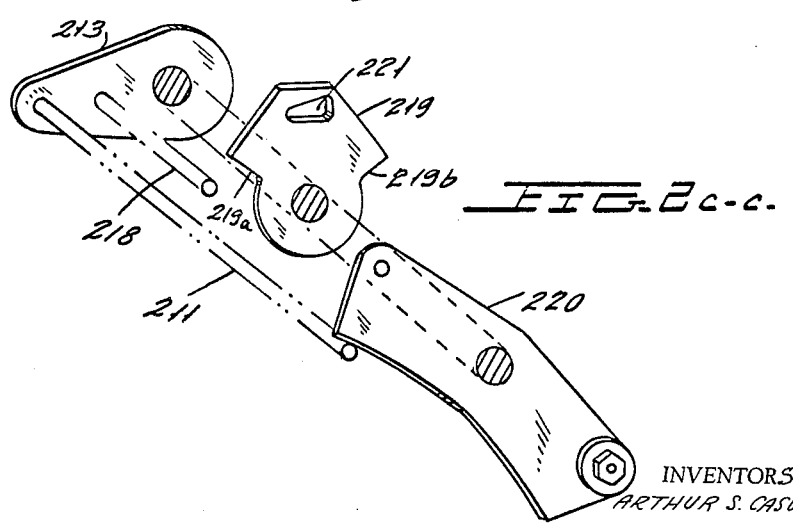
FIG. 2c-c
INVENTORS
ARTHUR S. CASWELL
SIGURD O. RODESEIKE
BY
OSTROLENK, FABER, GERB & SOFFEN
ATTORNEYS Feb. 15, 1966
A. S. CASWELL ETAL
3,234,803
SPRING OPERATOR MEANS
Filed June 24, 1963
6 Sheets-Sheet 4
FIG. 3a.
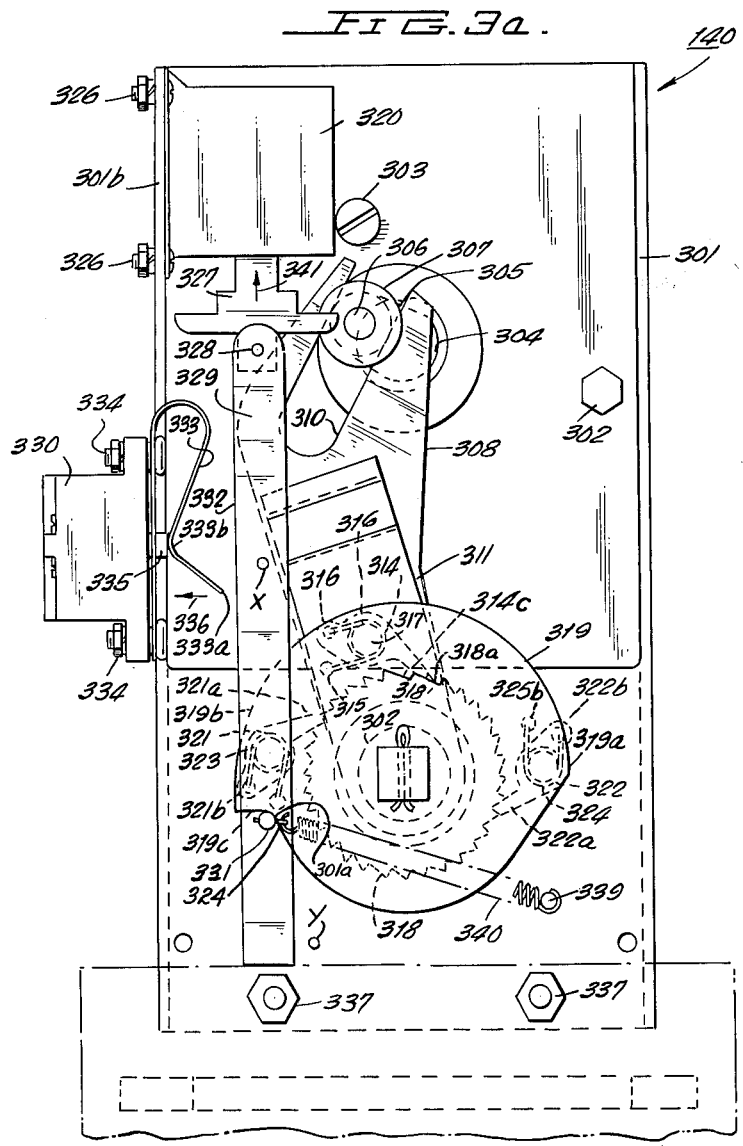
FIG. 3a-a.
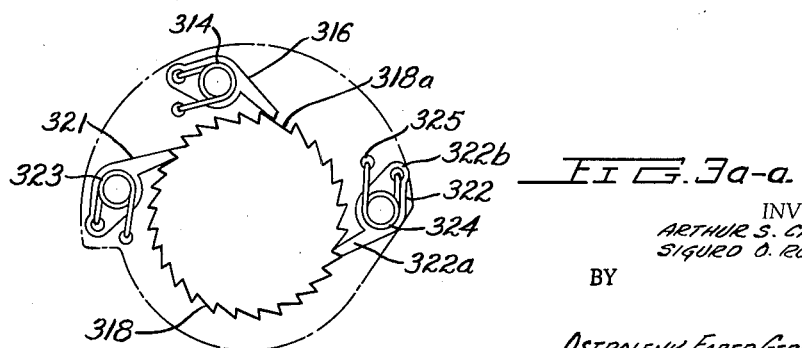
INVENTORS
ARTHUR S. CASWELL
SIGURD O. RODESEIKE
BY
OSTROLENK, FABER, GERB & SOFFEN
ATTORNEYS

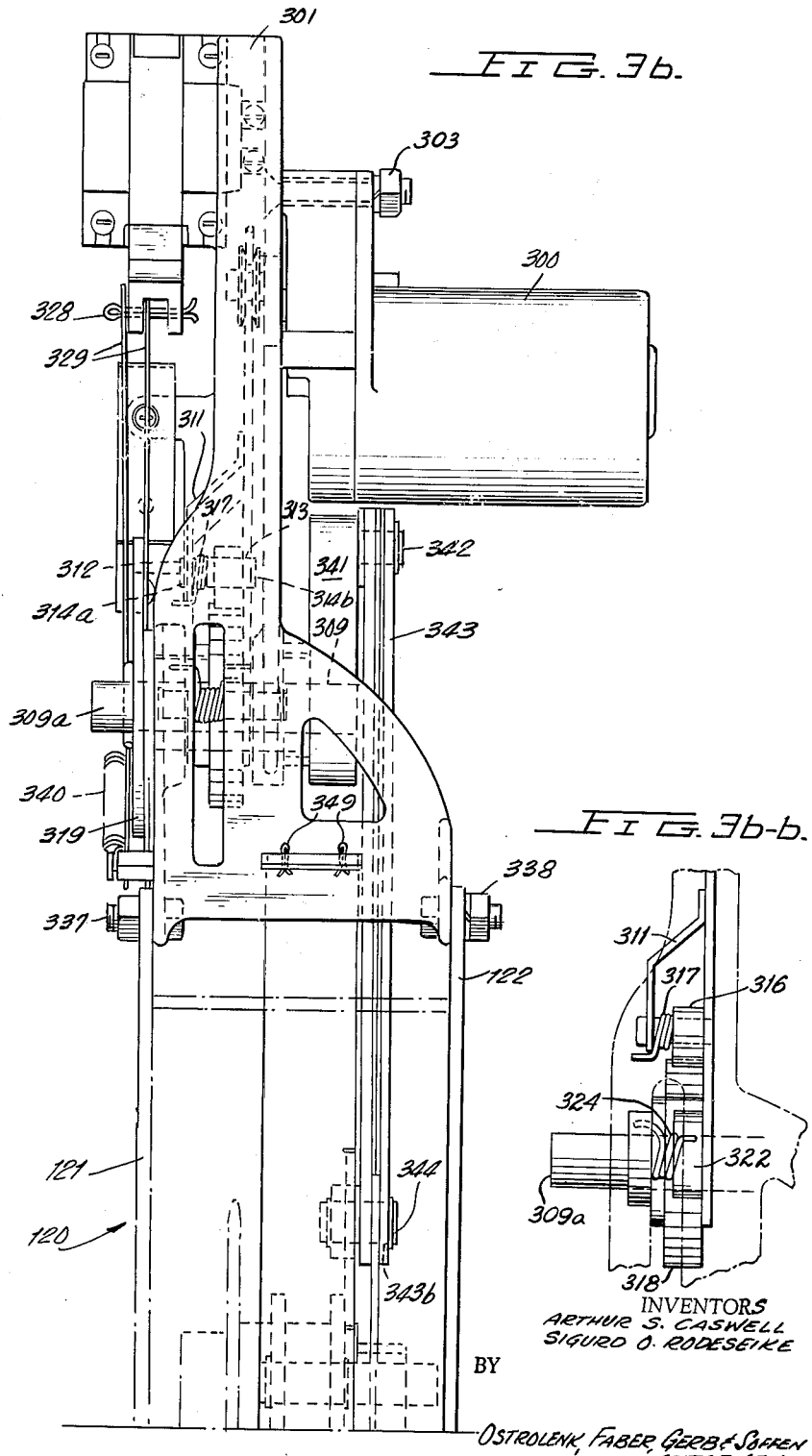

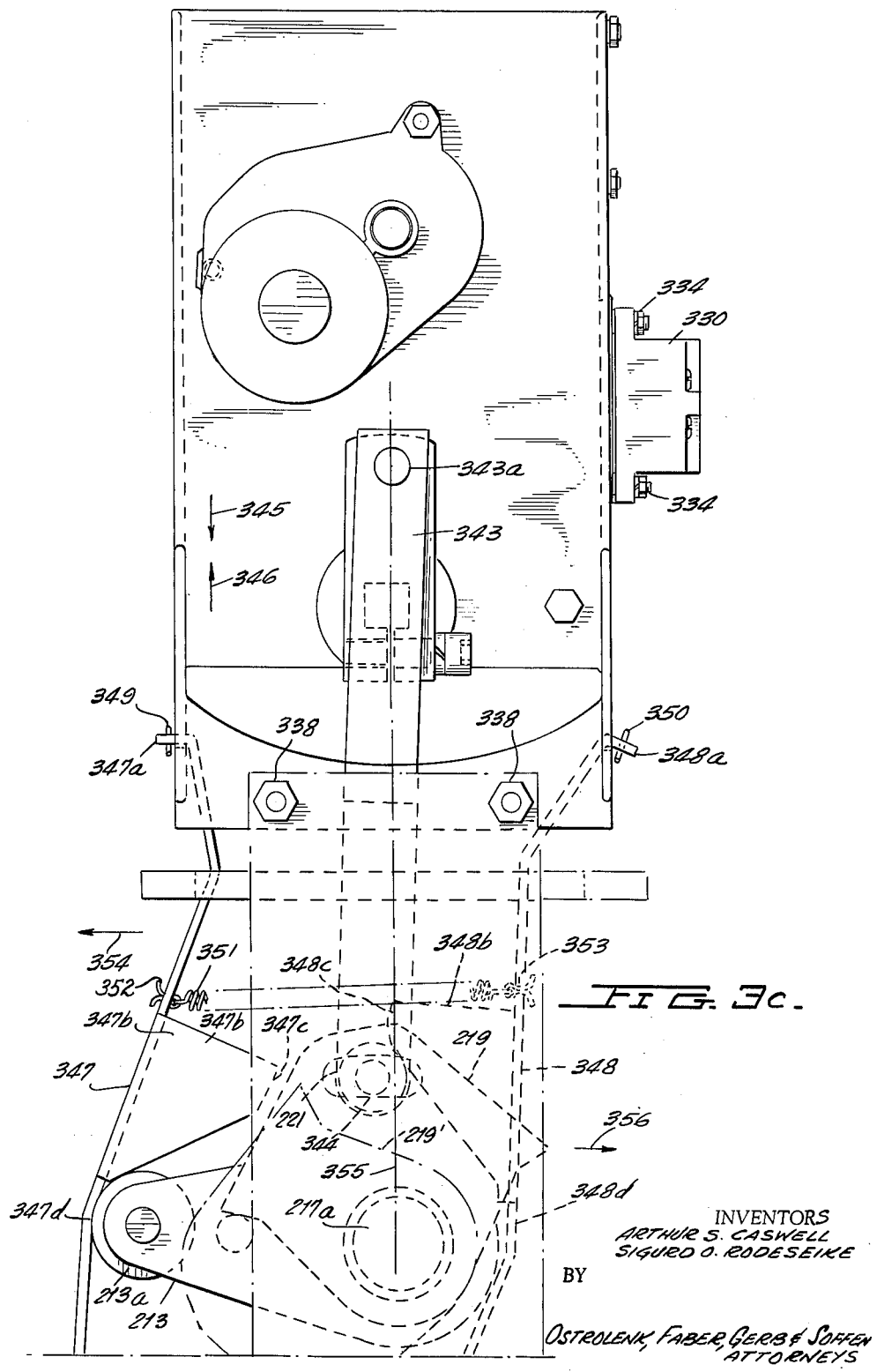

United States Patent Office 3,234,803
Patented Feb. 15, 1966

3,234,803
SPRING OPERATOR MEANS
Arthur S. Caswell and Sigurd O. Rodeseike, Greensburg, Pa., assignors to I-T-E Circuit Breaker Company, Philadelphia, Pa., a corporation of Pennsylvania
Filed June 24, 1963, Ser. No. 290,059
4 Claims. (Cl. 74—97)

This invention relates to load interrupter switches for poer distribution systems, and more particularly to load interrupter switches employing novel spring operator means for controlling the opening and closing of such switches wherein the novel operator means is comprised of a system of unique modular elements which may be arranged in varying combinations to provide as many or as few features as may be desired.

This application is related to co-pending application Serial No. 289,863 filed June 24, 1963, entitled "Spring Operator Manual Charging Means" of S. O. Rodeseike and assigned to the assignee of the instant application. The description and drawings of the aforementioned co-pending application are incorporated by reference into this application.

In power distribution systems, protective means in the form of circuit breakers are employed for the purpose of isolating a portion, or portions, of the distribution system from the energy source upon the occurrence of overload or severe fault current conditions. After the tripping of such circuit breakers, in order to further isolate the portion, or portions, of the distribution system, load interrupting switches are employed, which switches are manually operated to the open circuit condition to isolate a portion, or portions, of the distribution network from the energy source during the period in which the fault condition is being corrected and cleared. While such load interrupter switches are designed so as to isolate a portion or portions of the network after tripping of a circuit breaker, it is nevertheless desirable to provide load interrupter switches with the capability of being rapidly operated to both the open and closed position since the possibility may exist that the closing and/or opening operation may be performed accidentally or otherwise during the time in which the circuit connected to the load interrupter switch is energized.

The instant invention provides a spring operator for load interrupter switches wherein a single compressible spring means is provided to swiftly operate the load interrupter switch means to both the open and closed, or connected and disconnected positions.

The basic spring operator device is comprised of a pivotally mounted arm having its free end connected to the compressible spring means and is designed to rotate about a shaft to which it is secured. The arm may be operated by manual means connected to a chain drive which imparts rotation to both shaft and arm by means of a sprocket wheel. The spring means is moved to and beyond an overcenter position in which position it is in the fully charged condition. Upon reaching the overcenter condition, the spring discharges its stored energy to rapidly close or open the load interrupter switch, depending upon the position of the spring means before the charging operation. The spring means, in discharging, drives a second arm secured to a shaft to which one or a plurality of connecting links are ganged. Each such connecting link has its opposite end pivotally linked with an associated load interrupter switch blade member to operate the blade member to either the connected or disconnected position, depending upon the direction of rotation of the shaft operated by the spring operator means.

The spring operator means may also be driven to the compressed position by motor operated means, which may be electrically energized either locally or at some remote location.

The spring operator may also be charged by manual means operated by a suitable manual operating handle mounted exterior to the cubicle in which the ganged load interrupter switches are housed.

Each of the aforementioned elements comprising the entire spring operator system are modular in design, thereby permitting their rapid installation into a spring operator system. The modular designs further permit as many or as few of the cooperating subassemblies of the spring operator system to be readily combined in field installations, as well as in the shop. Also, it is further possible to add subassemblies to an already installed system, or to remove a subassembly of an already installed system, if for any reason the needs of the user are changed.

It is, therefore, one object of the instant invention to provide novel spring operator means for controlling the operation of a load interrupter switch to perform both rapid closing and rapid opening functions.

Another object of the instant invention is to provide novel spring operator means for load interrupter switches and the like having a novel configuration for permitting both manual and electrical charging of the spring operator means.

Still another object of the instant invention is to provide a novel spring operator means for load interrupter switches and the like having novel means for positioning the motor driven means connecting link which drives the spring operator means in the correct position for the next charging operation.

Still another object of the instant invention is to provide novel spring operator means for load interrupter switches and the like having novel means for automatically tripping the load interrupter switch under control of a blown fuse.

These and other objects of the instant invention will become apparent when reading the accompanying description and drawings in which:

FIGURES 2a, 2b and 2c are front, side and rear elevational views of the spring operator of FIGURE 1.

Figure 1:
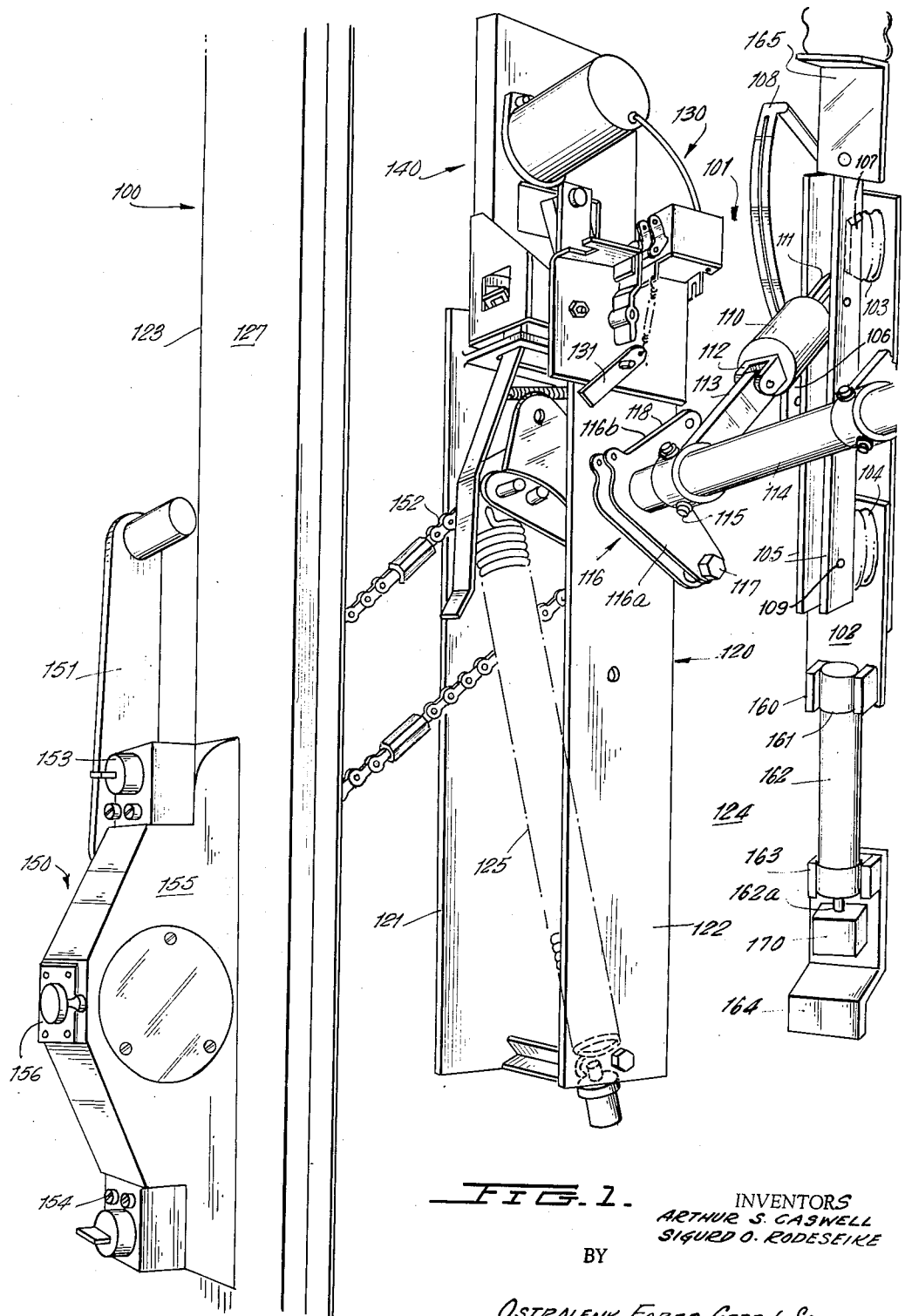
FIGURE 1 is a perspective view of a load interrupter switch under control of a spring operator means designed in accordance with the principles of the instant invention.

FIGURES 2a–a through 2c–c show the sequence of operation for the apparatus of FIGURES 2a–2c.

FIGURES 3a, 3b and 3c are front, side and rear elevational views of the motor driven charging means employed for charging the spring operator shown in FIGURE 1.

FIGURE 3a–a is a detailed view of the ratchet wheel shown in FIGURE 3a.

FIGURE 3b–b is a detailed view of FIGURE 3b.

*Spring operator system*

Referring now to the drawings, FIGURE 1 shows a ganged load interrupter switch installation 100 controlled by a spring operator means designed in accordance with the principles of the instant invention. The installation 100 is comprised of a plurality of vertically mounted load interrupting switches such as, for example, the switch 101 which is mounted to a vertical support 102 by means of insulator members 103 and 104. Switch 101 is comprised of a pivotally mounted main blade 105 and arcing blade 106, which is designed to come into engagement with the main contact 107 and the arcing contact (not shown) contained within the arc quenching chute 108 respectively. The main blade is pivoted at point 109 under control of insulating connecting arm 110 which is pivotally connected to blade 105 at 111 and further, pivotally connected at its opposite end 112 to rotatable arm 113. Rotatable arm 113 is keyed to shaft 114 by means of threaded members 115 so as to impart any rotational movement experienced by shaft 114 to the lever arm 113. The load interrupter switches described herein may be of any configuration similar to that shown in FIGURE 1 and the design lends no novelty to the system of the instant invention. Typical load interrupter switches which may be utilized in the spring operator means of the instant invention are set forth in copending application Serial No. 287,309, filed June 12, 1963, and Serial No. 286,661, filed June 10, 1963, both of which are assigned to the assignee of the instant invention, which describe the configurations and operations of such load interrupter switches in greater detail.

One, or a plurality of such load interrupter switches may be ganged to the operating shaft 114, in a manner similar to that described above. By ganging in this manner, a plurality of such load interrupter switches may be simultaneously operated to the open or closed positions, under control of a single spring operator means, in a manner to be more fully described. Typical examples of ganged installations would be a ganging of three such load interrupter switches to a single shaft for protecting a three-phase power distribution system. It should be understood, however, that a greater or lesser number of such load interrupter switches may be ganged to shaft 114.

The shaft 114 is journalled to rotate about its extreme left and right-hand ends (the bearing at the right-hand end not being shown in FIGURE 1) and is operated by the spring operator means which is connected to shaft 114 by the substantially L-shaped operating arm assembly 116 which is keyed to shaft 114 in any suitable manner. Both arms 116a and 116b of assembly 116 act as one, both being secured to shaft 114 by a welding operation. Both arms 116a and 116b, together with drive 220, support the roller 223 by virtue of fastening means 117 which also connects assembly 116 to drive 220 of spring operator 120.

The spring operator means 120 is comprised of first and second vertically positioned mounting plates 121 and 122, between which the spring operating means 120 is mounted. The spring operating means rear mounting plate 121 is rigidly bolted to the wall 124 of cubicle 123 which houses the load interrupter switches as well as the spring operating means.

The spring operating means 120 may be charged by motor driven means 140 mounted atop the spring operator means 120 in a manner shown in FIGURE 1, so as to charge the compressible spring 125 in order to rapidly operate the load interrupter switches to both the connected and disconnected positions. The discharge of the compressible spring 125 drives the operating member 116, in a manner to be more fully described, in order to rotate shaft 114 which imparts its rotational movement to the blades, such as, for example, the blade 105 of the load interrupter switches ganged to shaft 114. Shaft 114 may rotate in both the clockwise and counterclockwise directions to perform both rapid opening and closing operations.

Also mounted atop the spring operator means 120 is the latch means 130 which is provided with latch members, such as, for example, latch member 131 which cooperates with the roller member 118 of the operating member 116, to latch the compressible spring 125 in the spring charged to open and the spring charged to close positions in a manner to be more fully described. The latching means 130 is designed to be operated both manually and electrically by means to be more fully described.

In addition to the motor operated spring charging means 140, spring 125 may be compressed or charged by the manual charging means 150 vertically mounted along the outer wall 127 of cubicle 123. The manual charging means 150 is operated by handle 151 and is coupled to spring operator means 120 by means of chain drive 152, which engages sprocket wheels contained in both manual charging means 150 and spring operator means 120 which sprocket wheels are not shown in FIGURE 1, but will more fully be described hereafter.

The manual charging means is further provided with first and second locking means 153 and 154 which are designed to lock the spring operator means and hence the load interrupter switches in both the open and closed positions or any combination thereof by the novel interlock means (not shown) contained within the manual charging means housing 155. Housing 155 is provided with a window 156 beneath which an indicator ring (not shown) is positioned, in order to provide a visual indication of the condition of the spring operating means 120 and hence the load interrupter switches which the spring operator means controls. Although the spring operator means in the installation 100 of FIGURE 1 is shown mounted against the left-hand wall of cubicle 123, the spring operator means is sufficiently versatile so as to be mounted against the right-hand wall of the cubicle, which installation can be performed by a very simple reversal of parts so as to operate the shaft 114 for opening and closing operations of the load interrupter switches in the same manner as previously described. In a like manner, the manual charging means 150 may also be positioned along the right-hand side of front wall 127 of the cubicle 123. It can clearly be seen from the arrangement of FIGURE 1 that the four basic elements of the spring operating means, namely, the spring operator 120, the latch means 130, the motor driven charging means 140 and the manual charging means 150, are all modular type units and may be readily assembled into the system either upon manufacture thereof or right at the field installation where the spring operator means is to be employed. In addition thereto, any of the modular units may be removed or inserted after the initial installation to increase or decrease the number of functions desired by the user, thereby providing an extremely flexible spring operator installation.

Basic spring operator

FIGURES 2a–2c show the stripped-down basic spring operator unit 120 which is comprised of the first and second supporting plates 121 and 122 wherein left-hand mounting plate 121 is secured to the left-hand wall 124 of the cubicle by fastening means, such as, for example, the fastening means 201. Plates 121 and 122 are secured to one another at their lower ends by spacers 202 and at their upper ends by a plate 203. Plate 203 and spacers 202 may be fastened to the plates 121 and 122 in any suitable manner, such as, for example, by welding. The plates 121 and 122 are provided at their lower ends with suitable apertures for receipt of biasing means 204. The biasing means 204 serves as the pivotal support for a rod 205, which passes through a suitable opening in biasing means 204 so as to enable the rod to move upward and downward as shown by the arrows 207 and 206 respectively. First and second helical springs 208 and 209, respectively, comprise the compressible spring means 125, and are mounted so that the rod 205 is threaded through each of said springs. The lower ends of springs 208 and 209 bear against the upper surface of the biasing means 204, while the upper ends of springs 208 and 209 bear against a washer member 210, positioned at the upper end of rod 205. The upper end of rod 205 is provided with an aperture 211 for pivotal connection, with an opening 212 in lever arm 213. Suitable fastening means 214 pivotally links rod 205 to lever arm 213. As shown in FIGURE 2c, if the lever arm 213 is rotated in the counterclockwise direction, this drives rod 205 downward in the direction shown by arrow 206, causing first and second springs 208 and 209 to be compressed by means of their lower ends which bear against the biasing means 204. As soon as the lever arm pivot pin 214 reaches the dead center position represented by phantom line 215, springs 208 and 209 will be rapidly expanded thereby releasing their stored energy to perform the next opening (or closing) operation, in the manner to be more fully described. Two springs 208 and 209 have been employed instead of a single spring since the two springs provide ample stored energy, while at the same time occupying less space than a single spring capable of providing equivalent stored energy for operating the load interrupter switches.

The lever arm 213 is mounted for rotation upon shaft 216 which is journalled in bearing 217 provided in side plate 121. Lever arms 213 is further provided with a pin 218 which provides the function of being driven by the motor driven charging member 219, in a manner to be more fully described. When the spring operator means 120 of FIGURES 2a–2c is charged by the motor driving means 140 of FIGURE 1, the charging operation is performed by the motor operated driving member 219, having cammed surfaces 219a and 219b and an elongated slot 221. Elongated slot 221 is coupled to the connecting link (not shown) of the motor driving means and in the position shown in FIGURE 2c operates to drive the driving member 219 in the counterclockwise direction. This causes the cam surface 219a to bear against the pin 218 causing lever arm 213 to be driven in the counterclockwise rotation. When the pin 211 reaches the dead center position, as shown by the phantom pin designated by numeral 211', the pin 211 bears against the cam surface 220a' of member 220. As soon as the pin 211' moves beyond the dead center position represented by phantom line 215, the compressed springs 208 and 209 are free to release their stored energy, causing the lever 213 to continue moving counterclockwise from the dead center position shown by pin 211', moving the lever 213 to the phantom line position 213' shown in FIGURE 2c. Since the pin 211 bears against the cam surface 220a of member 220, this causes member 220 to likewise move in the counterclockwise direction. The counterclockwise rotation of member 220 is imparted (through a fastening assembly 117) to the driving link 116 which is comprised of first and second plates causing the driving link 116 to likewise be rotated in the counterclockwise direction. Member 220 is coupled to driving link 116 by the fastening arrangement 223 which can best be seen in FIGURE 2b. It should be noted that the shaft 114 which can best be seen in FIGURES 2b and 1 is journalled for rotation on shaft 216, which acts as an internal bearing for hollow shaft 114. Shaft 114, however, will rotate only under control of the driving link 116, and not under control of shaft 216. When the lever arm 213 is in the position shown by the dashed line 213', which may be, for example, the position which it occupies when the load interrupter switch is in the fully closed or connected position, the lever arm 213' may be rotated now in the clockwise direction to perform the rapid opening operation. This operation is substantially similar with the motor driven driving member 219 having its cam surface 219b bearing against the pin 218 to drive lever arm 213 clockwise until pin 218 occupies the dead center position 218'. In this position, pin 211' bears against the cam surface 220b' of member 220, which in the position shown by the phantom line 220' as soon as pin 211' passes the dead center position, it is rapidly urged in the clockwise direction due to the spring members 208 and 209 releasing their stored energy, thus driving the member 220 in the clockwise direction, which movement is imparted to the driving member 116 due to the coupling between driving member 220 and coupling member 116.

A sprocket 224 is rigidly secured to shaft 217 and may be driven into rotation by the chain drive 152 shown in FIGURE 1 so as to manually charge spring members 208 and 209. Since sprocket 224 is rigidly secured to the same hub as lever arm 213, any rotational movement imparted to sprocket 224 is coupled to lever arm 213 to perform the clockwise and counterclockwise rotation of lever arm 213 in order to effect the performance of both the rapid opening and the rapid closing operations. A further feature of the sprocket 224 is such that being coupled to lever arm 213 through the shaft 217, when the springs 208 and 209 are charged by the motor driving means, the motion of the lever arm 213 is nevertheless coupled to sprocket 224, which in turn couples this rotation through the chain drive 152 to the manual charging means 150, shown in FIGURE 1, so as to provide a continuous indication through the visible indicator means housed in the manual charging means housing 155 regardless of the fact that the spring operator means may be either manually or electrically operated.

A plurality of resilient washer members 229 are positioned at the lower end of rod 205 and are secured thereto by a pin means 228 threaded through an opening 205a in rod 205. The pin means 228 is further retained within the opening 205a by two cotter pins, such as, for example, the cotter pin 230 shown in FIGURE 2c. The resilient washer members 229 function to cushion the impact of the pin means 228 as it is urged in the direction of fastening means 204 when the lever arm 213 reaches the end of its opening [or closing] stroke and occupies the position substantially as shown in FIGURE 2c.

One simple means for operating the spring operator means 120 is comprised of a handle arm 250 having a suitable aperture 250a at its lower end for rigid securement to a shaft 251. The shaft 251 protrudes through a suitable opening 252 in the cubicle side wall and is journalled for rotation in vertical side plate 121. The extreme right-hand end of shaft 251 is provided with a sprocket wheel 253 which is coupled to spring operator means sprocket wheel 224 by a chain drive which has been omitted herein for purposes of clarity. The upper end of handle arm 250 is provided with a hand grip 254 pivoted to arm 250 by pin 255. By rotating handle arm 250 about its shaft 251 the spring operator means 120 may be operated to perform either the rapid opening or rapid closing operations. This arrangement is provided as an alternative to the manual charging means 150 of FIGURE 1 when the installation requires a side mounted handle arrangement.

In performing the rapid closing operation, it is necessary to provide the total spring force to close in the load interrupter switch blades against their associated stationary contacts when closing against high currents. FIGURE 2a shows an arrangement for catching or restraining spring 208 during the opening operation so as to greatly reduce the tremendous impact caused by both springs 208 and 209 during the discharge thereof. The catching means is comprised of a pivotally mounted member 260 provided with an aperture 261 at its lower end for receipt of the fastening means 204. The member 260 is provided with a pin 262 near its upper end for securing the first end of spring means 263, the opposite end of spring means 263 being secured to stationary pin 262a in vertical side plate 121. The upper end of compressible spring 208 is provided with a metal collar 264, the upper edge of which bears against washer 210. Collar 264 is provided with projecting pins 265 on opposite sides thereof which are adapted to mate with a slot 266 provided in [each] member 260.

The operation of the spring restraining member 260 is as follows:

Let it be assumed that the arrangement shown in FIGURE 2a is such that when the lever arm 213 is rotated in the clockwise direction, this rotation will cause a load interrupter switch opening operation. With the position of the spring member means 120 as shown in FIGURE 2a, spring restraining member 260 is biased in the clockwise direction about fastening means 204 due to the biasing force of spring means 263. Member 260, however, is restrained from any clockwise rotation beyond the position shown in FIGURE 2a due to the presence of stop in 267 which is affixed to vertical side plate 122 of spring operator means 120. As the arm 213 rotates clockwise, pins 265 enters the slots 266 provided in restraining arms 260. At this time, however, spring means 209 is still free to completely discharge its stored energy so as to take complete control of the spring closing operation. Thus spring 208 releases its stored energy during only a portion of the closing operation thereby greatly reducing the severe impact accompanying the discharge of the springs 208 and 209. As can be seen in FIGURE 2b, the spring restraining means 260 is actually comprised of first and second members 260a and 260b coupled together by a pin means 268. Thus, when stop pin 267 bears against member 260b, this restrains both members 260a and 260b from any further clockwise rotation beyond the position in FIGURE 2a. It will be noted that there are two pins 265 provided on collar 264 for engaging notches, such as, for example, the notch 266 in members 260a and 260b.

*Motor driven charging means*

The motor driven charging means 140, which can best be seen in FIGURES 3a–3c, is comprised of a motor 300 secured to a substantially U-shaped support plate 301 by fastening means 302 and 303. The motor is operated from a local sources of energy (not shown) and is provided with an output shaft 304 mounted to rotate a crank 305. The crank is provided with a pin 306 offset from the center of crank 305 and upon which a roller member 307, which operates as an output means, is pivotally mounted. The roller output crank 307 acts to operate a reciprocating arm 308 which is pivoted at its lower end about a shaft 309. The upper end of reciprocating arm 308 is provided with an elongated notch 310 which slidably engages the output crank roller 307 to permit the upper end of reciprocating arm 308 to experience reciprocal movement upon rotation of the crank 305 and hence the eccentrically mounted output crank roller 307. The reciprocating arm 308 is provided with an offset portion 311, which can best be seen in FIGURES 3a and 3b whereby the main body 308 and the offset arm 311 are provided with apertures 312 and 313 for receiving the ends 314a and 314b of a pin inserted through pawl 314. The offset arm 311 is provided with an aperture 315 and the pawl 314 is provided with an aperture 316 for receiving the opposite ends, respectively, of a torsion spring 317 which is so designed as to bias the pawl 314 to have its front end 314c to bear against a sprocket wheel 318. The sprocket wheel 318 is pivotally mounted upon shaft 309 and is provided with a missing tooth portion 318a for a purpose to be more fully described. An eccentric cam 319 is affixed to the left-hand portion 309a of shaft 309 which has a substantially square cross-section so as to experience any rotation of the shaft 309a imparted thereto by the sprocket 318 which is also rigidly affixed to shaft 309. The eccentric cam 319 is provided with cam surfaces 319a and 319b for the purpose of deenergizing the motor means in a manner to be more fully described, and is further provided with a shoulder 319c which cooperates with a solenoid 320 to initiate the charging operations, in a manner to be more fully described.

Second and third pawls 321 and 322 are affixed to the support member 301 and each are provided with a respective torsion spring 323 and 324 for biasing the front ends 321a and 322a of pawls 321 and 322 into engagement with the teeth of the procket wheel 318, for a purpose to be more fully described. Apertures 325a and 321b are provided in the support means 301 and the pawl 321, respectively, for receiving the ends of torsion spring 323, while apertures 325b and 322b are provided in support 301 and pawl 322 respectively to receive the opposite ends of torsion spring 322.

The solenoid member 320 is affixed to the support means flange 301b by fastening means 326, and is provided with an armature 327 which is pivotally connected at 328 to a connecting link 329 which provides the dual function of both initiating operation of the motor driven charging means 140 and of deenergizing the motor 300 in cooperation with a switch means 330, in a manner to be more fully described. The lower end of connecting link 329 is provided with a pin 331 such that the two arms forming the connecting link 329 are positioned on opposite sides of eccentric cam 319 with the pin 331 bearing against the shoulder 324 of eccentric cam 319 for initiation of the motor charging operation, as will be fully described. The connecting link 329 is free to rotate about its pivot point 328 in such a manner as to have its left-hand edge 332 free to bear against the marginal edge 333a of a substantially U-shaped spring member 333 which cooperates with the switch means 330. The switch means 330 is secured to the flange 301b by fastening means 334, and is provided with a depressible button 335 which when in the position as shown in FIGURE 3a places the switch in the closed position. Switch 330 is connected in series relationship with the leads (not shown) connecting the motor 300 to the energy source. Thus, in the position as shown in FIGURE 3a switch 330 being closed permits energization of motor 300. When the connecting link 329 moves clockwise about its pivot point 328, its left-hand edge 332 bears against the marginal edge 333a of spring member 333 causing its portion 333b to bear against button 335 causing it to be depressed. Upon depression thereof, this opens switch 330 thereby breaking the series path between the motor 300 and the energizing source (not shown). The substantially U-shaped support member 301 is affixed at its lower end to the vertical side support plates 121 and 122 of the spring operator means 120 by the fastening means 337 and 338 respectively, as can best be seen in FIGURE 3b. The supporting plate 301 is further provided with a pin 339 for mounting a first end of a spring means 340 the opposite end of which is secured to the pin 331 of the connecting links 329 for the purpose of urging the connecting links towards the counterclockwise direction about its pivot point 328. Spring 340 is mounted between pivot pin Y on plate 301 and pivot pin X on link 329 when the mechanism 140 is used in an inverted position in order to overcome the weight of the armature 327 and link 332 due to gravity.

The operation of the motor driven charging means is as follows:

The motor 300 is energized by closure of any suitable switch means (not shown) to rotate the output shaft 304. This causes the output crank roller 307, mounted upon crank 305, to rotate about shaft 304. The roller member 307, due to its rotational movement imparts reciprocating motion to the reciprocating arm 308. Since pawl 314 is pivotally secured to reciprocating arm 308 and offset arm 311 the front portion thereof 314c bears against sprocket 318. However, in the position shown in FIGURE 3a, pawl 314 is unable to advance sprocket 318 since it is positioned in the region of the missing tooth 318a. In order therefore to begin rotation, the solenoid member 320 is simultaneously energized with the energization of motor means 300 causing the armature member 327 to be urged upward in the direction shown by arrow 341. This causes connecting links 329 to be driven in the direction shown by arrow 341 such that the pin 331 at the lower end of connecting links 329 bears against the shoulder 319c in eccentric cam 319. This causes eccentric cam 319 to undergo a predetermined amount of clockwise rotation about the shaft 309. The clockwise rotation is imparted through shaft 309 to which it is rigidly affixed to the sprocket 318 which is also rigidly affixed to shaft 309. This predetermined amount of clockwise rotation is sufficient to advance the first tooth 318' to a position to the right of the right-hand edge 314c of pawl 314. As soon as this occurs, pawl 314 is able to advance ratchet 318 one tooth at a time until the missing tooth portion 318a undergoes a complete revolution and is again positioned in a location shown in FIGURE 3a.

The second and third pawl members 321 and 322 are provided so that when the missing tooth portion 318a is positioned beneath the front ends 321a and 322a respectively, of either of pawls 321 or 322, the other pawl will hold the ratchet wheel in its appropriate position without stepping backwards. Thus, as pawl 314, under control of reciprocating arm 308, advances ratchet wheel 318 one tooth at a time, either or both of the pawls 321 and 322 act to lock ratchet wheel 318 in the position to which it was last advanced, while the pawl 314 moves to the left due to the reciprocating action of arm 308 in order to pick up the next tooth. The reactive force on the ratchet wheel 318 is due to the spring members 208 and 209 of FIGURES 2a–2c which are being charged due to the rotation of ratchet wheel 318 and which are connected thereto by suitable linkages, which is to be more fully described.

As the ratchet wheel 318 continues its rotation, the cam surface 319a of eccentric cam 319 moves to a position on the opposite side of shaft 309. That is, it undergoes a 180° rotation. This cam surface 319a bears against the pin 331 causing the connecting links 329 to be rotated in the clockwise direction about their pivot point 328 to cause the left-hand edges 332 thereof to bear against the marginal edge 333a of spring member 333. As soon as the location 319a bears against the pin 331 the spring member 333 acts to fully depress button 335 causing the current path connecting the motor 300 to the energy source to be cut off. At this time, even though the motor is not energized, no breaking means are provided and the motor 300 is permitted to coast to a stop. The ratchet wheel 318 may still be under control of the motor means and will continue advancing until the missing tooth position 318a is again positioned in a location as shown in FIGURE 3a. The motor means is designed to coast to a stop and normally requires approximately the time which it takes to undergo a one-half revolution rotation of ratchet wheel 318. If the motor has not yet coasted to a stop and still continues to cause arm 308 to reciprocate, none of this reciprocating movement will advance ratchet wheel 318 due to the positioning of the missing tooth region 318a beneath the pawl 314. As soon as this position is achieved, the biasing spring 340 acts to rotate connecting links 329 counterclockwise about the pivot point 328 causing the pin 331 to again be positioned beneath the shoulder 319c provided in eccentric cam 319. This places the motor operated charging means in position for the next charging operation and releases the depressible button 335 to again establish a closed current path between the motor 300 and the energy source (not shown).

The shaft 309 has mounted thereto a crank arm 341 which is rigidly affixed to the shaft and which is provided with a pin 342 at its upper end. A driving link 343 is provided with a suitable aperture 343a for receiving pin 342 so as to pivotally connect crank 341 to driving link 343. The lower end of connecting link 343 is provided with a suitable aperture 343b for receiving a pin 344 which is threaded therethrough and which is further threaded through the elongated slot 221 provided in drive member 219 which can best be seen in FIGURES 3c and 2c respectively. The rotation of the ratchet wheel 318 is imparted to shaft 309 which causes crank 341 to rotate therewith, driving the connecting link 343 downward in the direction shown by arrow 345 so as to impart rotational motion to the driving member 219, in the manner as previously described with reference to FIGURES 2a–2c. Let it first be assumed that the connecting link 343 causes the driving link 219 to be rotated counter-clockwise so that it assumes the position shown by the dotted configuration 219'. As previously described, this complete action takes place through only one-half revolution of the ratchet wheel 318. Thus, the remaining 180° rotation of ratchet wheel 318 is undergone under a no-load condition since the connecting link 343 is simply driven in the upper direction, as shown by arrow 346 to return the driving member 219 to the position substantially as shown in FIGURE 3c. Thus, the coasting operation of the motor 300 is done under a no-load condition and the ratchet wheel 318 is thereby easily stepped through the remaining 180° rotation to return the missing tooth portion 318a to the position as shown in FIGURE 3a.

Since the connecting link 343 undergoes substantially only reciprocal action in moving first downward in the direction shown by arrow 345 and upward in the direction shown by arrow 346, means 347 and 348 are provided for appropriately positioning the pin 344 at the correct end of elongated slot 221 in drive member 219. The biasing means 347 and 348 are substantially flat irregularly shaped members, as can best be seen in FIGURE 3c and are provided with flanges 347a and 348a respectively, at their upper ends, which flanges are inserted through suitable slots provided in the supporting member 301. Each of the members 347 and 348 are further provided with cotter pins 349 and 350 so as to retain the flanges 347a and 348a within the suitable slots of support member 301. The members 347 and 348 are permitted to then hang substantially freely suspended from the support member 301 and are further biased toward one another by the spring member 351 which is secured to members 347 and 348 by means of cotter pins 352 and 353 respectively, which are threaded through apertures provided in members 347 and 348 so as to secure the opposite ends of spring member 351, in the manner shown in FIGURE 3c. Each of the members 347 and 348 are further provided with cam surfaces 347c and 348c respectively, which extend substantially towards one another, as can best be seen in FIGURE 3c, for the purpose of suitably positioning the lower end of connecting link 343. In operation, the lever arm 213 is capable of assuming either of the positions 213 or 213', as shown in FIGURE 2c. Considering FIGURE 3c, the operating arm 213 is in such a position that the roller member 213a pivotally connected thereto bears against member 347 at 347d. Thus, instead of hanging substantially downward, member 347 is urged a predetermined amount in the direction shown by arrow 354. Member 348 is drawn in substantially the same direction due to its connection with member 347 through spring member 351. This causes the cam surface 348c to bear against pin 344 thereby urging the pin to take up a position at substantially the extreme left-hand end of the elongated slot 221. This places the pin 344 substantially to the left of the dead center position shown by phantom line 355. Thus, at the initiation of the next motor charging operation, the connecting link 343 will cause the driving member 219 to be rotated counterclockwise about its shaft 216 to rotate or drive the lever arm 213 counterclockwise which is as it should be. As soon as the lever arm 213 passes the dead center condition it will immediately permit discharge of the compressed springs 208 and 209 causing the lever arm 213 to move to the position 213' as shown in FIGURE 2c. In this position, the roller member 213 will bear against member 348 at position 348d causing the member 348 to be driven a predetermined distance to the right, as shown by arrow 356. Member 347 will also be urged in the direction shown by arrow 356 due to its connection with member 348 through spring means 351. This, in turn, will cause cam surface 347c to bear against pin 344 urging it to the extreme right-hand end of elongated slot 221. Thus, at the beginning of the next motor charging operation, connecting link 343 will rotate the drive member 219 clockwise about its shaft 217a which again is as it should be. Thus, it can be seen that regardless of the fact that the motor 300 has its output shaft driven in only one direction at all times and regardless of the fact that the ratchet wheel 318 rotates in the same direction at all times, the correct rotation is imparted to the drive member 219 by the positioning means 347 and 348 so that the driving means 219 is never driven in the improper direction. Since the spring operator means may be mounted to either the left-hand or right-hand wall of the cubicle, the clockwise rotation of drive member 219 shown in FIGURE 3c may be employed to initiate either the closing or opening operation and likewise the counterclockwise rotation of drive member 219 may be employed to initiate either the spring closing or spring opening operations, depending only upon the needs of the user.

When the motor charging means is used without latches, the solenoid 320 is wired so that as long as the contact means (not shown) that starts the charging sequence is maintained, the solenoid 320 remains energized, holding pin 331 in the uppermost position, so as to keep the contact (not shown) of switch 330 open to prevent a pumping action.

It can be seen from the foregoing that the manual charging means may be readily incorporated with a spring operator installation so as to provide manual charging capabilities at such an installation. In addition thereto, either or both of the interlocking arrangements may be added to the manual charging means to provide still further capabilities. The design of the manual charging means is such that it may be readily added to an already installed assembly with relative ease so as to provide an installation with further capabilities which it did not desire at the time that the initial installation was made.

It can be seen from the foregoing that the instant invention provides a spring operator arrangement having subassemblies, each of which are modular in design to enable swift and ready assembly between and among these modular design devices to provide a spring operator structure having as many or as few capabilities and features as is desired by the user. In addition thereto, each of these modular devices may be installed in the field or in the factory and may further be added to an already installed system so as to increase its capabilities at any date after its initial installation whereby such modifications can be made swiftly and readily.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Spring operator means for operating load interrupter switches and the like comprising compressible spring means having a first end thereof restrained from linear movement; a first shaft; lever means pivotally linked to the second end of said spring means; said lever means being mounted to said shaft for relative rotation therewith; a second shaft mounted to rotate independently of said first shaft; cam means mounted to said second shaft; said lever means having a first and second pin mounted thereto extending in the direction of said cam means; means for driving a load interrupter switch between its connected and disconnected positions being linked to said cam means; the rotation of said lever means causing said compressible spring means to be compressed and thereby charged until said lever means reaches a dead center position; said compressible spring means when fully charged being adapted to rapidly rotate said lever means when said lever means passes said dead center position; said first pin being positioned to rotate said cam means and drive said driving means during the discharging operation; a sprocket wheel connected to said lever means; manual charging means including a chain drive connected to said sprocket wheel for rotating said lever means to charge said compressible spring means; second charging means comprising motor operated means and second cam means mounted on said first shaft to rotate independently of said lever means in response to actuation of said motor operated means; said second cam means having first and second cam surfaces selectively engageable with said second pin for rotating said lever means and charging said compressible spring means; said second charging means providing a second manner of charging said compressible spring means which is independent of said manual charging means.

2. Spring operator means for operating load interrupter switches and the like comprising compressible spring means having a first end thereof restrained from linear movement; a first shaft; lever means pivotally linked to the second end of said spring means; said lever means being mounted to said shaft for relative rotation therewith; a second shaft mounted to rotate independently of said first shaft; cam means mounted to said second shaft; said lever means having a pin mounted thereto extending in the direction of said cam means; means for driving a load interrupter switch between its connected and disconnected positions being linked to said cam means; the rotation of said lever means causing said compressible spring means to be compressed and thereby charged until said lever means reaches a dead center position; said compressible spring means when fully charged being adapted to rapidly rotate said lever means when said lever means passes said dead center position; said pin being positioned to rotate said cam means and drive said driving means during the discharging operation; said lever means being rotatable in either the clockwise or counterclockwise directions to charge said compressible spring means for rapidly driving a load interrupter switch to either the opening or closing position; said compressible spring means comprising first helical spring means; a rod pivotally linked at one end to said lever means and being extended through said first spring means; first means positioned near the opposite end of said spring means having an aperture; the second end of said rod extending through said aperture; a washer having an aperture for receiving said rod being positioned at said one end of said rod adjacent said lever means; said first spring having a first and second end abutting said washer and said first means respectively; second helical spring means having an inner diameter sufficient to receive both said rod and said first spring means therethrough; a cylindrical shaped collar being affixed to one end of said second spring means adjacent said lever means; the opposite end of said second spring means abutting said first means; first and second pins extending from said collar and being positioned approximately 180° apart along said collar; spring restraining means for engaging said collar first and second pins during a spring operator opening operation to restrain said second spring means from releasing its stored energy.

3. Spring operator means for operating load interrupter switches and the like comprising compressible spring means having a first end thereof restrained from linear movement; a first shaft; lever means pivotally linked to the second end of said spring means; said lever means being mounted to said shaft for relative rotation therewith; a second shaft mounted to rotate independently of said first shaft; cam means mounted to said second shaft; said lever means having a pin mounted thereto extending in the direction of said cam means; means for driving a load interrupter switch between its connected and disconnected positions being linked to said cam means; the rotation of said lever means causing said compressible spring means to be compressed and thereby charged until said lever means reaches a dead center position; said compressible spring means when fully charged being adapted to rapidly rotate said lever means when said lever means passes said dead center position; said pin being positioned to rotate said cam means and drive said driving means during the discharging operation; said lever means being rotatable in either the clockwise or counterclockwise directions to charge said compressible spring means for rapidly driving a load interrupter switch to either the opening or closing position; said compressible spring means comprising first helical spring means; a rod pivotally linked at one end to said lever means and being extended through said first spring means; first means positioned near the opposite end of said spring means having an aperture; the second end of said rod extending through said aperture; a washer having an aperture for receiving said rod being positioned at said one end of said rod adjacent said lever means; said first spring having a first and second end abutting said washer and said first means respectively; second helical spring means having an inner diameter sufficient to receive both said rod and said first spring means therethrough; a cylindrical shaped collar being affixed to one end of said second spring means adjacent said lever means; the opposite end of said second spring means abutting said first means; first and second pins extending from said collar and being positioned approximately 180° apart along said collar; spring restraining means for engaging said collar first and second pins during a spring operator opening operation to restrain said second spring means from releasing its stored energy; said spring restraining means comprising first and second elongated members each being pivoted at a first end thereof to said first means and each having a notch at a second end thereof for receiving one of said collar pins; said first and second elongated members being positioned on opposite sides of said collar.

4. Spring operator means for operating load interrupter switches and the like comprising compressible spring means having a first end thereof restrained from linear movement; a first shaft; lever means pivotally linked to the second end of said spring means; said lever means being mounted to said shaft for relative rotation therewith; a second shaft mounted to rotate independently of said first shaft; cam means mounted to said second shaft; said lever means having a pin mounted thereto extending in the direction of said cam means; means for driving a load interrupter switch between its connected and disconnected positions being linked to said cam means; the rotation of said lever means causing said compressible spring means to be compressed and thereby charged until said lever means reaches a dead center position; said compressible spring means when fully charged being adapted to rapidly rotate said lever means when said lever means passes said dead center position; said pin being positioned to rotate said cam and drive said driving means during the discharging operation; said lever means being rotatable in either the clockwise or counterclockwise directions to charge said compressible spring means for rapidly driving a load interrupter switch to either the opening or closing position; said compressible spring means comprising first helical spring means; a rod pivotally linked at one end to said lever means and being extended through said first spring means; first means positioned near the opposite end of said spring means having an aperture; the second end of said rod extending through said aperture; a washer having an aperture for receiving said rod being positioned at said one end of said rod adjacent said lever means; said first spring having a first and second end abutting said washer and said first means respectively; second helical spring means having an inner diameter sufficient to receive both said rod and said first spring means therethrough; a cylindrical shaped collar being affixed to one end of said second spring means adjacent said lever means; the opposite end of said second spring means abutting said first means; first and second pins extending from said collar and being positioned approximately 180° apart along said collar; spring restraining means for engaging said collar first and second pins during a spring operator opening operation to restrain said second spring means from releasing its stored energy; said spring restraining means comprising first and second elongated members each being pivoted at a first end thereof to said first means and each having a notch at a second end thereof for receiving one of said collar pins; said first and second elongated members being positioned on opposite sides of said collar; biasing means connected between said spring restraining means and a stationary pin for urging said spring restraining means toward said collar; a stop pin for limiting the movement of said spring restraining means towards said collar; fastening means coupling said first and second members at a point intermediate their ends to cause said elongated members to rotate in unison.

References Cited by the Examiner

UNITED STATES PATENTS

| | | | |
|---|---|---|---|
| 1,208,863 | 12/1916 | Waldow | 74—2 |
| 1,393,111 | 10/1921 | Getchell | 74—97 X |
| 1,444,556 | 2/1923 | Sachs | 74—97 |
| 1,835,982 | 12/1931 | Hammerly | 74—97 X |
| 2,174,969 | 10/1939 | Collings | 74—2 |
| 2,995,043 | 8/1961 | Lusk et al. | 74—97 |
| 3,064,484 | 11/1962 | Alsaker | 74—97 |

FOREIGN PATENTS 82,784  3/1935  Sweden.

BROUGHTON G. DURHAM, *Primary Examiner.*

MILTON KAUFMAN, *Examiner.*

DALE A. THIEL, *Assistant Examiner.*